United States Patent
Mendu

(10) Patent No.: US 8,516,296 B2
(45) Date of Patent: *Aug. 20, 2013

(54) EFFICIENT ARCHITECTURE FOR INTERFACING REDUNDANT DEVICES TO A DISTRIBUTED CONTROL SYSTEM

(75) Inventor: Krishna R. Mendu, Sharon, MA (US)

(73) Assignee: Invensys Systems, Inc., Foxboro, MA (US)

( * ) Notice: Subject to any disclaimer, the term of this patent is extended or adjusted under 35 U.S.C. 154(b) by 320 days.

This patent is subject to a terminal disclaimer.

(21) Appl. No.: 12/983,958

(22) Filed: Jan. 4, 2011

(65) Prior Publication Data

US 2011/0099416 A1    Apr. 28, 2011

Related U.S. Application Data

(63) Continuation of application No. 12/147,794, filed on Jun. 27, 2008, now Pat. No. 7,877,625.

(60) Provisional application No. 61/045,339, filed on Apr. 16, 2008.

(51) Int. Cl.
*G06F 11/00*    (2006.01)

(52) U.S. Cl.
USPC .......................................................... 714/4.1

(58) Field of Classification Search
USPC .......................................................... 714/4.1
See application file for complete search history.

(56) References Cited

U.S. PATENT DOCUMENTS

| | | |
|---|---|---|
| 4,872,106 A | 10/1989 | Slater |
| 5,274,645 A | 12/1993 | Idleman et al. |
| 5,590,381 A | 12/1996 | Mourad |
| 5,623,532 A | 4/1997 | Houde et al. |
| 5,680,580 A | 10/1997 | Beardsley et al. |
| 5,777,874 A | 7/1998 | Floor et al. |
| 5,933,347 A | 8/1999 | Cook et al. |
| 5,940,826 A | 8/1999 | Heiderman et al. |
| 6,170,044 B1 | 1/2001 | McLaughlin et al. |
| 6,243,829 B1 | 6/2001 | Chan |
| 6,295,575 B1 | 9/2001 | Blumenau et al. |
| 6,501,995 B1 | 12/2002 | Kinney et al. |
| 6,523,138 B1 | 2/2003 | Natsume et al. |
| 6,606,630 B1 | 8/2003 | Gunlock |
| 6,625,747 B1 | 9/2003 | Tawil et al. |

(Continued)

OTHER PUBLICATIONS

I/A Series, System; Field Device System Integrators (FBM230/231/232/233) User's Guide; B0700AH Rev L; Invensys Process Systems; May 6, 2009; pp. 1-246.

(Continued)

*Primary Examiner* — Bryce Bonzo

(74) *Attorney, Agent, or Firm* — Edward S. Jamolowicz

(57) ABSTRACT

A system and method for interfacing redundant devices to a distributed control system, includes a first and second redundant field bus modules communicably coupled to the distributed control system and to one another via switches. A pair of redundant field devices are coupled to the switches, one FD having an address. The FBMs adopt respective roles as master FBM and tracker FBM, so that the master FBM is configured to capture data from the one FD using the address, and to pass any data changes periodically to the tracker FBM, through the switches. The master FBM is configured to point to the other field device in the event the other field device has assumed the address. The FBMs are configured to switch roles in the event communication is disrupted between the master FBM and the FD having the address.

27 Claims, 3 Drawing Sheets

(56) References Cited

U.S. PATENT DOCUMENTS

| | | |
|---|---|---|
| 6,658,590 B1 | 12/2003 | Sicola et al. |
| 6,779,128 B1 | 8/2004 | Gale et al. |
| 6,868,509 B2 | 3/2005 | Gale et al. |
| 6,898,727 B1 | 5/2005 | Wang et al. |
| 6,968,242 B1 | 11/2005 | Hwu et al. |
| 6,978,346 B2 | 12/2005 | Baek et al. |
| 6,978,397 B2 | 12/2005 | Chan |
| 6,996,741 B1 | 2/2006 | Pittelkow et al. |
| 7,006,431 B1 | 2/2006 | Kanekar et al. |
| 7,039,827 B2 | 5/2006 | Meyer et al. |
| 7,043,728 B1 | 5/2006 | Galpin |
| 7,058,846 B1 | 6/2006 | Kelkar et al. |
| 7,073,022 B2 | 7/2006 | El-Batal et al. |
| 7,127,633 B1 | 10/2006 | Olson et al. |
| 7,149,923 B1 | 12/2006 | Heiderman et al. |
| 7,152,182 B2 | 12/2006 | Ji et al. |
| 7,155,638 B1 | 12/2006 | Heideman et al. |
| 7,178,057 B1 | 2/2007 | Heiderman et al. |
| 7,181,642 B1 | 2/2007 | Heiderman et al. |
| 7,197,660 B1 | 3/2007 | Liu et al. |
| 7,246,255 B1 | 7/2007 | Heiderman et al. |
| 7,246,256 B2 | 7/2007 | De La Cruz et al. |
| 7,272,746 B2 | 9/2007 | Deerman et al. |
| 7,401,254 B2 | 7/2008 | Davies |
| 7,505,819 B2 | 3/2009 | El-Sayed |
| 7,506,124 B2 | 3/2009 | Sharma et al. |
| 7,533,288 B2 | 5/2009 | Hatasaki et al. |
| 7,590,727 B1 | 9/2009 | Barnes |
| 2001/0020282 A1 | 9/2001 | Murotani et al. |
| 2002/0191649 A1 | 12/2002 | Woodring |
| 2003/0018927 A1 | 1/2003 | Gadir et al. |
| 2005/0080895 A1 | 4/2005 | Cook et al. |
| 2005/0229034 A1 | 10/2005 | Fujibayashi |
| 2005/0257213 A1 | 11/2005 | Chu et al. |

OTHER PUBLICATIONS

Rinaldi, John; EtherNet/IP Overview; An Application Layer Protocol for Industrial Automation; Real Time Automation Inc., Brookfield, WI; 2009; pp. 1-4.

EtherNet/IP Scanner Source Code Stack; Real Time Automation; Brookfield, WI; 2009; pp. 1-2.

Logix5000 Data Access; Reference Manual; Publication 1756-RM005A-EN-E; Rockwell Automation PN957259-71; Mar. 2000; pp. 1-38.

Ethernet-to-the-Factory 1.2 Design and Implementation Guide, Cisco Validated Design; Jul. 22, 2008; Cisco and Rockwell Automation; pp. 1-238.

EFFICIENT ARCHITECTURE FOR INTERFACING REDUNDANT DEVICES TO A DISTRIBUTED CONTROL SYSTEM

RELATED APPLICATIONS

This application is a Continuation of U.S. patent application Ser. No. 12/147,794 entitled An Efficient Architecture for Interfacing Redundant Devices to a Distributed Control System, filed on Jun. 27, 2008 now U.S. Pat. No. 7,877,625, which claims the benefit of U.S. Provisional Application Ser. No. 61/045,339 entitled Efficient Architecture for Interfacing Redundant Devices to a Distributed Control System, filed on Apr. 16, 2008, the contents of which are incorporated herein by reference in their entirety for all purposes.

BACKGROUND

1. Technical Field

This invention relates to control systems and, more particularly, to fault-tolerant methods and apparatus for process control.

2. Background Information

The terms "control" and "control systems" refer to the control of the operational parameters of a device or system by monitoring one or more of its characteristics. This is used to insure that output, processing, quality and/or efficiency remain within desired parameters over the course of time.

Control is used in a number of fields. Process control, for example, is typically employed in the manufacturing sector for process, repetitive and discrete manufacture, though it also has wide application in electric and other service industries. Environmental control finds application in residential, commercial, institutional and industrial settings, where temperature and other environmental factors must be properly maintained. Control is also used to monitor and control devices used in the manufacture of various products, ranging, for example, from toasters to aircraft.

Control systems typically utilize field devices, including sensors and the like, which are integrated into the equipment being controlled. For example, temperature sensors are usually installed directly on or within the articles, bins, or conduits that process, contain or transport the materials being measured. Control devices such as valves, relays, and the like, must also be integrated with the equipment whose operations they govern.

Predictability is among the key requirements of any control device. A fluid sensor that even occasionally produces unreliable readings is unacceptable. Overengineering may insure better reliability; however, it often results in devices that are too expensive or too large for wide application.

Redundancy is a well accepted alternative to overengineering. It typically involves using two or more standard control elements in place of one. The duplicated units can be field modules, controllers or other higher-level elements in the control hierarchy.

Thus, for example, U.S. Pat. No. 4,347,563 discloses an industrial control system in which redundant processing units serve as bus masters "of the moment," monitoring status information generated by primary processing units. If a redundant unit detects that a primary has become faulty while executing an application program, the redundant unit loads that program and takes over the primary's function.

U.S. Pat. No. 5,008,805, on the other hand, discloses a real time control system in which "sender" and "listener" processors synchronously step through sequential schedules, with the sender controlling execution of events sent from a host. The listener monitors the sender and in the event of fault, assumes the role of the latter, executing commands omitted during the takeover interval.

A shortcoming of these and many other prior art redundancy schemes is their imposition of undue computational or hardware overhead. U.S. Pat. No. 5,008,805, for example, has the disadvantage of requiring that the sender and listener operate in lock-step, necessitating common timing lines and up-front synchronization procedures.

The I/A Series process control systems, manufactured by the assignee hereof, represent a significant advance in this technology. They utilize a fault-tolerant architecture including a workstation which provides a monitoring and control interface for operations and maintenance staff. Control algorithms may be executed in one or more control processors (CPs), with control achieved via redundant fieldbus modules (FBMs) that connect to Field Devices (FDs), such as transmitters or Programmable Logic Controllers (PLCs), and sensors or valves associated with the physical equipment to be operated. Various software packages provide historical tracking of plant data, alarming capabilities, operator action tracking, and status of all stations on the process control system network.

Each fieldbus module (FBM), for example, has a redundant, shadow (tracker) partner. The tracker is configured to assume the primary 'master' role, such as in the event of a failure or other error, to permit it to be replaced or updated without taking the system off-line.

In this approach, each of the redundant FBMs communicates with, and captures identical data from, redundant Field Devices (FDs).

While the prior art techniques have proven effective to date, the ever increasing complexity of control systems render those techniques problematic. For example, the data stream between the Master FD and each FBM tends to be of relatively large bandwidth, due to the nature of the often complex protocols used by the process control network. This bandwidth is even larger due to the duplicate data being sent to both FBMs in order to ensure full redundancy. Response time by the Master FD is thus often undesirably slow due both to this relatively large amount of traffic, and because the Master FD needs to process requests from both FBMs. In addition, use of Floating or Dynamic IP Addresses at the FD level also adds complexity to this overall approach.

Thus, a need exists for an improved fault-tolerant approach for process control that addresses the foregoing drawbacks.

SUMMARY

In one aspect of the invention, a system for interfacing redundant devices to a distributed control system, includes a first field bus module (FBM) communicably coupled to the distributed control system, the first FBM coupled to a first switch; a second FBM communicably coupled to the distributed control system, the second FBM coupled to a second switch; with the first and second FBMs communicably coupled to one another by the switches. A pair of field devices (FDs) are coupled to the switches, the FDs being redundant of one another, wherein data is synchronized therebetween. One FD of the pair has an address, and the first and second FBMs are redundant of one another, so that data is synchronized therebetween through the first and second switches. The first and second FBMs are configured to adopt respective roles as master FBM and tracker FBM, so that the master FBM is configured to capture data from the one FD using the address, and to pass any data changes periodically to the tracker FBM, through the switches. The other FD of the pair is configured to assume the address in the event of a failure of the one FD. The master FBM is configured to point to the other field device in the event the other field device has assumed the address. The first and second FBMs are configured to switch roles in the event communication is disrupted between the master FBM and the FD having the address. The system is redundant so that data is preserved in the event of failure of any one of the FBMs and FDs and/or switches.

In another aspect of the invention, a method of interfacing redundant devices to a distributed control system includes communicably coupling a first field bus module (FBM) to the distributed control system, coupling the first FBM to a first switch, communicably coupling a second FBM to the distributed control system, coupling the second FBM to a second switch and communicably coupling the first and second FBMs to one another by the switches. A pair of field devices (FDs) are coupled to the switches, the FDs being redundant of one another, wherein data is synchronized therebetween, one FD of the pair having an address. The first and second FBMs are configured to be redundant of one another, wherein data is synchronized therebetween through the first and second switches. Additional steps include configuring the first and second FBMs to adopt respective roles as master FBM and tracker FBM, wherein the master FBM is configured to capture data from the one FD using the address, and to pass any data changes periodically to the tracker FBM, through the switches; configuring the other FD of the pair to assume the address in the event of a failure of the one FD; configuring the master FBM to point to the other field device in the event the other field device has assumed the address; and configuring the first and second FBMs to switch roles in the event communication is disrupted between the master FBM and the FD having the address. The system is thus redundant so that data is preserved in the event of failure of any one of the FBMs and Fds and/or switches.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
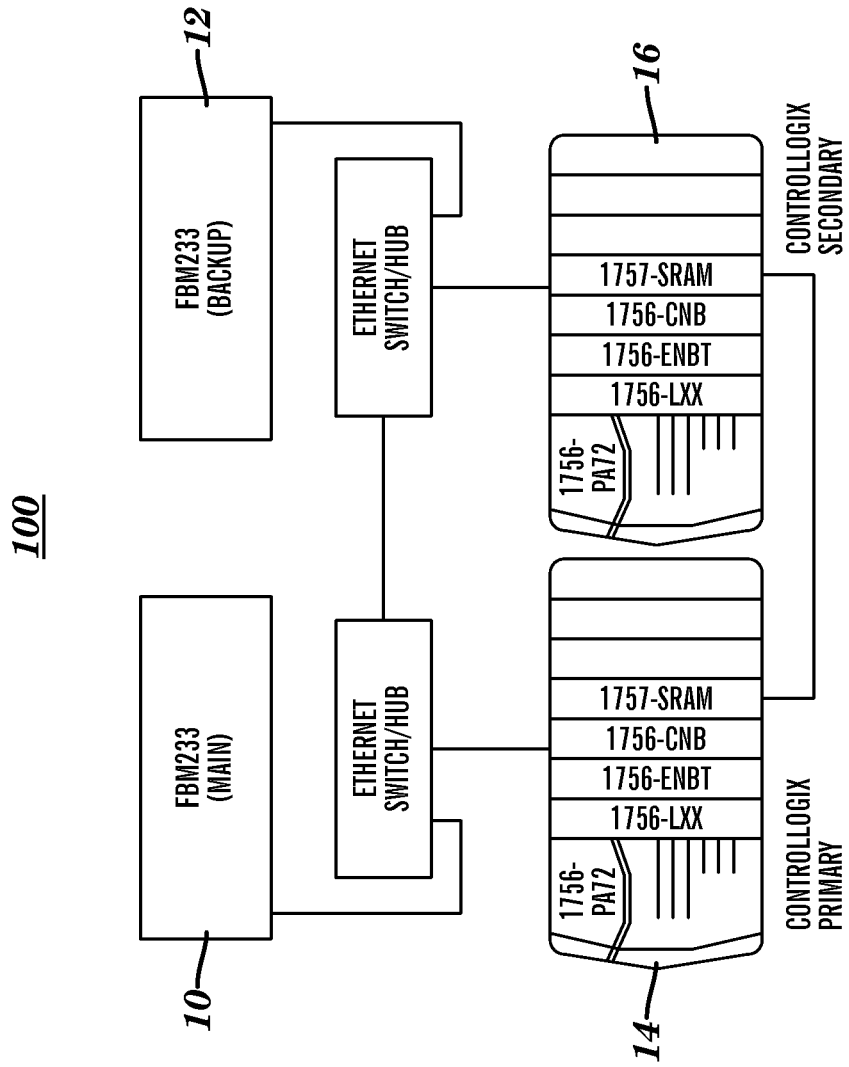
FIG. 1 is schematic diagram of a pair of process control field devices and a pair of field bus modules in accordance with an embodiment of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Where used in this disclosure, the term "computer" is meant to encompass a workstation, person computer, personal digital assistant (PDA), wireless telephone, or any other suitable computing device. A "fieldbus" is a digital, two-way, multi-drop communication link among intelligent measurement and control devices, and serves as a local area network (LAN) for advanced process control, remote input/output and high speed factory automation applications.

Embodiments of the system and method of the present invention can be programmed in any suitable language and technology, including, but not limited to: C++; Visual Basic; Java; VBScript; Jscript; BCMAscript; DHTM1; XML and CGI Hypertext Markup Language (HTML), Active Server-Pages (ASP) and Javascript. Alternative versions maybe developed using other programming languages. Any suitable database technology can be employed, including, but not limited to: Microsoft Access and IMB AS 400.

Referring to FIG. 1, a distributed control system 100 includes a representative embodiment of the present invention, in the form of a redundancy architecture using Field Bus Modules (FBMs) that communicate with Field Devices (FDs) via Ethernet protocols. As shown, system 100 includes redundant FBMs 10, 12, e.g., in a 'Master' and 'Tracker' configuration, which are configured to each communicate with, and capture data from, redundant FDs 14, 16.

Figure 2:
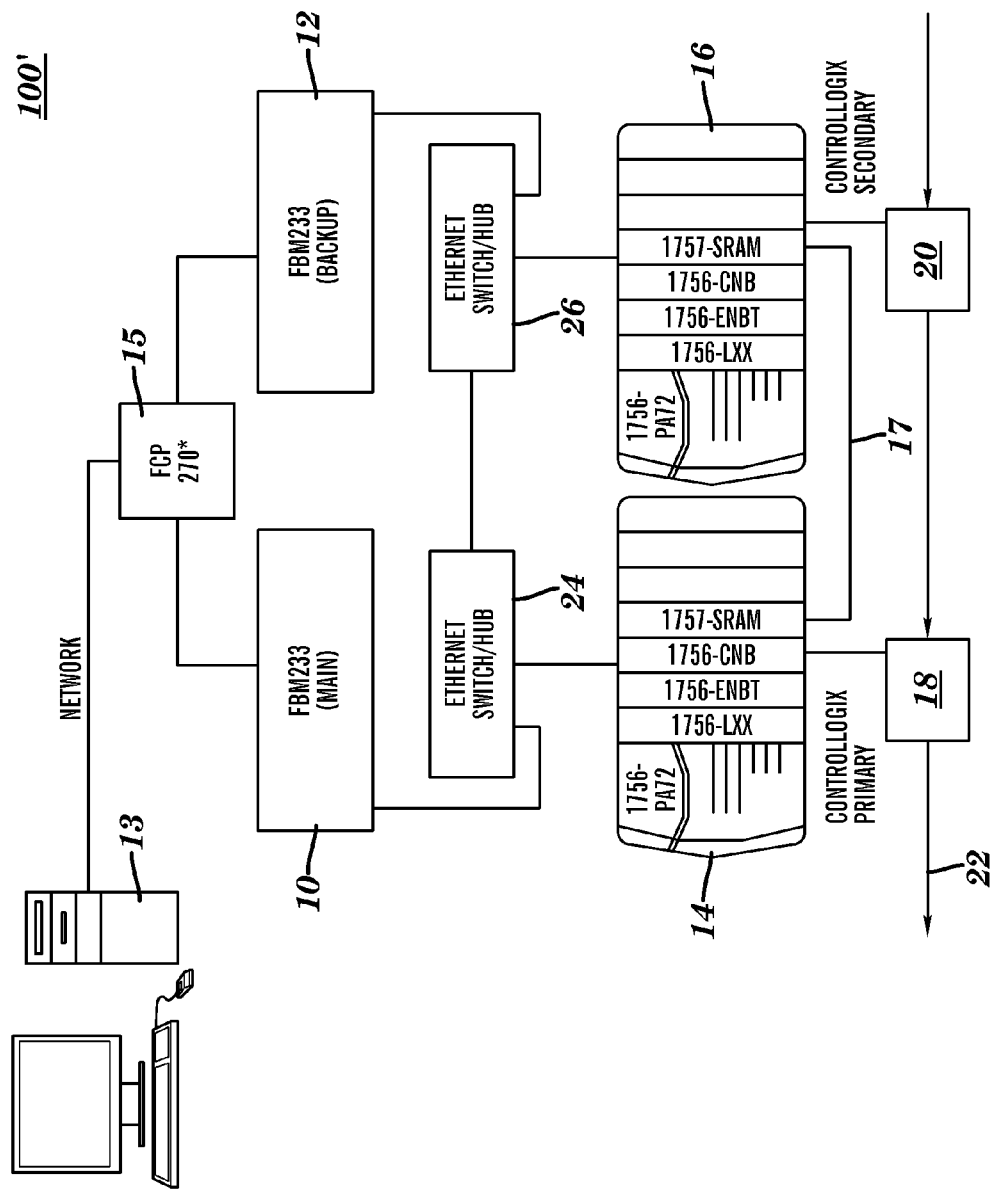
FIG. 2 is a view similar to that of FIG. 1, of an alternate embodiment of the present invention.

Referring now to FIG. 2, system 100' may include system 100, along with a workstation 13 which provides a monitoring and control interface for operations and maintenance staff. Control algorithms may be executed in one or more control processors (CPs) 15, which are communicably coupled to the FBMs 10, 12 to achieve control via the FDs 14, 16, and sensors 18, 20, associated with the physical equipment or process 22.

In particular embodiments, system 100' includes an I/A Series process control system, with CP 15 including an FCP 270 or ZCP Control Processor available from Invensys Systems, Inc., Foxboro, Mass., ("Invensys"). The FBMs 10, 12 may be conventional FBM 233 control processors, also available from Invensys, which are modified in accordance with the teachings of the present invention.

The FDs 14, 16 are redundant of one another, in which data is synchronized therebetween, e.g., using a direct link 17. The FDs 14, 16 are configured as 'Master' and 'Tracker' FDs, and may use Floating (e.g., Dynamic) IP Addresses to communicate with the network via Ethernet switches 24, 26, respectively. In the event of a failure of the 'Master' FD, the 'Tracker' FD is configured to assume the floating IP address that had been used by the Master FD, so that either one of the redundant FBMs 10, 12 can point to, and capture data from, this new 'Master' FD.

The FBMs 10, 12 are redundant of one another, being configured to communicate with one another to synchronize their data via their Ethernet switches 24, 26 (e.g., through Ethernet ports on each FBM). The FBMs 10, 12 are configured to adopt respective roles as master FBM and tracker FBM, wherein the master FBM is configured to capture data from the master FD, e.g., using the floating IP address, and to pass any data changes periodically to the tracker FBM, through the Ethernet switches. The FBMs 10, 12 are configured to switch roles in the event communication is disrupted between the master FBM and the master FD. System 100 is thus redundant at both the FBM and FD levels, so that data is preserved in the event of failure of any one of the FBMs 10, 12 and FDs 14, 16.

The Tracker FBM is thus configured to receive data updates from the Master FBM, rather than to obtain duplicate data directly from the FDs 14, 16. This approach eliminates the need for additional resources in the form of additional communication links between the redundant FBMs, by taking advantage of the unused portion of the relatively high bandwidth Ethernet links 24, 26 used by the FBMs.

In addition to communication between FBMs 10, 12, the Ethernet ports on each FBM are also used for all communication between the FBMs and the FDs 14, 16. Thus, all FBM traffic, i.e., traffic between the redundant FBMs 10, 12, and between the FBMs and the FDs 14, 16, occurs 'in band', i.e., within the same network. This approach also eliminates the need for two duplicate data streams from the master FD to each of the FBMs 10, 12, to effectively halve the amount of data passing from the FD level to the FBM level. This reduction in data traffic tends to decrease (i.e., speed up) response time of the master FD, and otherwise free resources of the FDs for other processing tasks, e.g., for relatively fast data updates from the FD. This also generally provides the additional benefit of field data updates reaching the CP 15 more quickly, for relatively fast feedback and hence fast control of the overall system 100, 100'.

The overall amount of data being transferred to the Tracker FBM is relatively low, since only changes in data are passed to the Tracker. Thus, the Tracker only needs to send relatively short messages to the FD to simply ensure that the communication link between the FBMs is operational. The FBMs 10, 12 are also configured to effectively update the floating IP address of the FDs 14, 16 in real time, e.g., in the event the Master FD fails and the floating IP address is assumed by the Tracker.

In representative embodiments, the redundant FDs 14, 16 include programmable logic controllers (PLCs), which in turn, may be communicably coupled to any number of sensors 18, 20 associated with a process 22 (such as to measure flow through a conduit). As a non-limiting example, the FDs may be ControlLogix™ Programmable Logic Controllers (PLCs) by Allen-Bradley Company, Inc. (Rockwell International). (Suitable PLCs may also be available from Telvent Git, S.A.) These ControlLogix PLCs include the aforementioned ability to communicate with one another via a direct link 17, for redundant, 'Primary' and 'Secondary' operation. They are also configured to use Floating (e.g., Dynamic) IP Addresses to communicate with the network via Ethernet switches 24, 26, and for the 'Tracker' to assume the floating IP address. Moreover, each PLC is configured, upon assumption of the 'Master' role, to broadcast its ownership of this IP address with its MAC address, to system 100. The redundant FBMs 10, 12 may thus conveniently receive this ownership information to point to, and capture data from, this new 'Master' FD.

It should be noted that the tracker FBM may communicate directly with one or more of the FDs 14, 16, such as to obtain status information and/or to otherwise ensure proper operation/readiness. However, the tracker FBM is configured to be synchronized with the master FBM independently of any communication with the FDs 14, 16, i.e., all data updates are effected solely between the FBMs 10, 12, without any need for the tracker FBM to receive data from the FD level. As discussed above, this provision nominally eliminates any need for duplicate data traffic from the FD level to the FBM level. Moreover, in various embodiments as shown, the FBMs 10, 12 are synchronized independently of any off-network (out of band) communication. In other words, the FBMs 10, 12 are synchronized using their network switches 24, 26, without the need for any direct links therebetween. Embodiments of the invention thus enable the FBMs to be synchronized using only a single data stream from the FDs 14, 16 to the FBMs 10, 12. Various embodiments also effect this FBM synchronization by sending only changes in data from the master FBM to the tracker FBM. This provision serves to further reduce data traffic on the network, to free up system resources for other tasks as discussed above.

It is also noted that in the event the tracker FD has assumed the floating IP address to assume the role of master FD, the FBM may point to this new master FD in real time. As used herein, the term 'real time' refers to sensing and responding to external events nearly simultaneously (e.g., within milliseconds or microseconds) with their occurrence, or sufficiently fast to enable the device to keep up with an external process (for example, sufficiently fast as to avoid losing data generated by the FDs).

Although the FBMs 14, 16 may be provided with multiple Ethernet ports and/or switches 24, 26, only a single Ethernet port is required to communicate with the FDs 14, 16 and with the tracker FBM.

Figure 3:
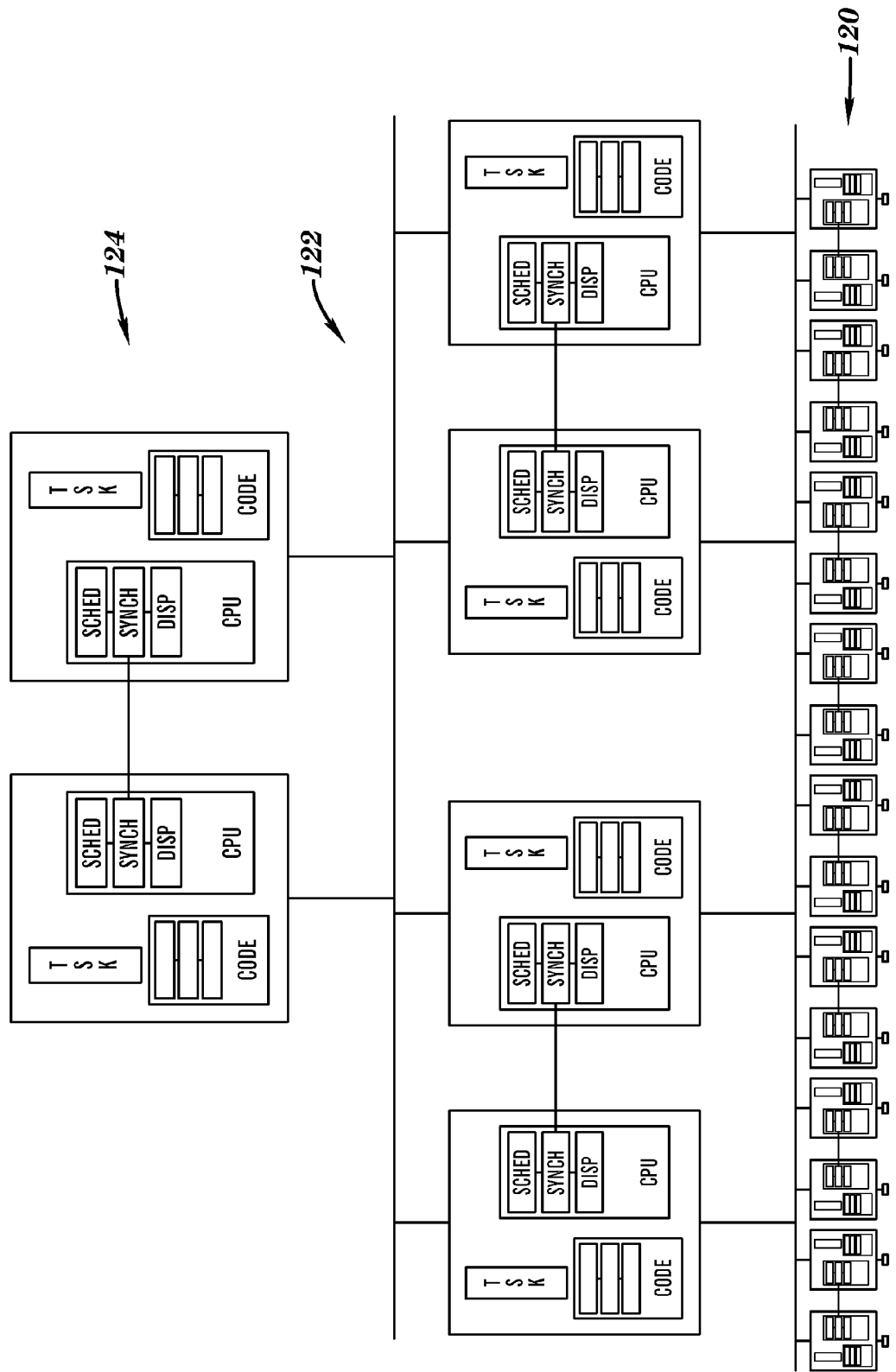
FIG. 3 is a view similar to that of FIGS. 1 and 2, of another embodiment of the present invention.

Moreover, although the foregoing embodiments have been shown and described as having a single pair of FBMs 10, 12 and FDs 14, 16, it should be recognized that aspects of the present invention may be applied to process control systems and apparatus of substantially any number of components. For example, a process control system in which the invention is employed in a plurality of pairs of FDs 120, FBMs 122 and CPs 124 is illustrated in FIG. 3.

Referring now to the following Table I, a method of interfacing redundant devices to a distributed control system, in accordance with the present invention, is shown and described.

TABLE I

200 Couple a first field bus module (FBM) to the distributed control system
202 Couple the first FBM to a first Ethernet switch
204 Couple a second FBM to the distributed control system
206 Couple the second FBM to a second Ethernet switch
208 Couple the first and second FBMs to one another by the Ethernet switches
210 Couple a pair of field devices (FDs) to the Ethernet switches, the FDs being redundant of one another, so that data is synchronized therebetween, one FD of the pair having a floating IP address
212 Configure the first and second FBMs to be redundant of one another, so that data is synchronized therebetween through the first and second Ethernet switches
214 Configure the first and second FBMs to adopt respective roles as master FBM and tracker FBM, so that the master FBM is configured to capture data from the one FD using the floating IP address, and to pass any data changes periodically to the tracker FBM, through the Ethernet switches
216 Configure the other FD of the pair to assume the floating IP address in the event of a failure of the one FD
218 Configure the master FBM to point to the other field device in the event the other field device has assumed the floating IP address
220 Configure the first and second FBMs to switch roles in the event communication is disrupted between the master FBM and the FD having the floating IP address, so that data is preserved in the event of failure of any one of the FBMs and FDs At 200, a first FBM is communicably coupled to the distributed control system. The first FBM is coupled to a first Ethernet switch at 202. At 204, a second FBM is communicably coupled to the distributed control system, and at 206, the second FBM is communicably coupled to a second Ethernet switch. At 208, the Ethernet switches are used to couple the first and second FBMs to one another. A pair of field devices (FDs) are coupled to the Ethernet switches at 210, the FDs being redundant of one another, wherein data is synchronized therebetween, one FD of the pair having a floating IP address. At 212, the first and second FBMs are configured to be redundant of one another, so that data is synchronized therebetween through the first and second Ethernet switches. At 214, the first and second FBMs are configured to adopt respective roles as master FBM and tracker FBM, so that the master FBM is configured to capture data from the one FD using the floating IP address, and to pass any data changes periodically to the tracker FBM, through the Ethernet switches. The other FD of the pair is configured, at 216, to assume the floating IP address in the event of a failure of the one FD. The master FBM is configured 218 to point to the other field device in the event the other field device has assumed the floating IP address. The first and second FBMs are configured 220 to switch roles in the event communication is disrupted between the master FBM and the FD having the floating IP address, so that data is preserved in the event of failure of any one of the FBMs and FDs.

Optional aspects of this method are shown and described with respect to Table II.

TABLE II

224 Use programmable logic controllers (PLCs) used as the redundant FDs
226 Configure the FBMs to receive a notification that the other FD has assumed the floating point IP address, so that either of the FBMs can point to, and capture data therefrom
228 Synchronize the tracker FBM with the master FBM independently of any communication with the FDs
230 Synchronize the tracker FBM and master FBM independently of any off-network (out of band) communication therebetween
232 Synchronize the tracker FBM and master FBM using only a single data stream from the FDs to the FBMs
234 Synchronize the tracker FBM by sending only changes in data from the master FBM
236 Configure, in real time, the master FBM to point to the other field device, in the event the other field device has assumed the floating IP address
238 Configure the master FBM to use a single Ethernet port for communication with the FD, and for communication with the tracker FBM
240 Couple a field control processor (FCP) to the first and second FBMs
242 Place a local communications link between the first and second FDs for FD synchronization Optionally, at 224, programmable logic controllers (PLCs) may be used as the FDs. FBMs may be configured 226 to receive a notification that the other FD has assumed the floating point IP address, so that either of the FBMs can point to, and capture data therefrom. Moreover, the tracker FBM may be synchronized 228 with the master FBM independently of any communication with the FDs. The tracker FBM and master FBM may also be synchronized 230 independently of any off-network (out of band) communication therebetween. The tracker FBM and master FBM may also be synchronized 232 using only a single data stream from the FDs to the FBMs. At 234, the tracker FBM may be synchronized by sending only changes in data from the master FBM.

Additional optional aspects include configuring 236, in real time, the master FBM to point to the other field device, in the event the other field device has assumed the floating IP address. The master FBM may be configured 238 to use a single Ethernet port for communication with the FD, and for communication with the tracker FBM. A field control processor (FCP) may be coupled 240 to the first and second FBMs. A local communications link may be coupled 242 between the first and second FDs for FD synchronization.

It should be understood that any of the features described with respect to one of the embodiments described herein may be similarly applied to any of the other embodiments described herein without departing from the scope of the present invention.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

Having thus described the invention, what is claimed is:

1. A system for interfacing redundant devices to a distributed control system, the system comprising:
   a first field bus module (FBM) communicably coupled to the distributed control system;
   the first FBM coupled to a first switch;
   a second FBM communicably coupled to the distributed control system;
   the second FBM coupled to a second switch;
   the first and second FBMs communicably coupled to one another by the switches;
   a pair of field devices (FDs), coupled to the switches;
   the FDs being redundant of one another, wherein data is synchronized therebetween;
   one FD of the pair having an address;
   the first and second FBMs being redundant of one another, wherein data is synchronized therebetween through the first and second switches;
   the first and second FBMs configured to adopt respective roles as master FBM and tracker FBM, wherein the master FBM is configured to capture data from the one FD using the address, and to pass any data changes periodically to the tracker FBM, through the switches;
   the other FD of the pair configured to assume the address in the event of a failure of the one FD;
   the master FBM configured to point to the other field device in the event the other field device has assumed the address;
   the first and second FBMs configured to switch roles in the event communication is disrupted between the master FBM and the FD having the address;
   wherein the system is redundant so that data is preserved in the event of failure of any one of the FBMs, FDs or switches.

2. The system of claim 1, wherein the redundant FDs comprise programmable logic controllers (PLCs).

3. The system of claim 2, wherein the other FD is configured to, upon assumption of the address, broadcast its ownership of the address to the FBMs, so that either of the FBMs can point to, and capture data therefrom.

4. The system of claim 3, wherein the tracker FBM is synchronized with the master FBM independently of any communication with the FDs.

5. The system of claim 4, wherein the tracker FBM and master FBM are synchronized independently of any off-network (out of band) communication therebetween.

6. The system of claim 5, wherein the tracker FBM and master FBM are synchronized using only a single data stream from the FDs to the FBMs.

7. The system of claim 6, wherein the tracker FBM is synchronized by sending only changes in data from the master FBM.

8. The system of claim 1, wherein the master FBM is configured to point to the other field device in real time, in the event the other field device has assumed the address.

9. The system of claim 1, wherein the master FBM is configured to use a single port for communication with the FD, and for communication with the tracker FBM.

10. The system of claim 1, comprising a field control processor (FCP) coupled to the first and second FBMs.

11. The system of claim 1, comprising a local communications link disposed between the first and second FDs for synchronizing the FDs.

12. A method of interfacing redundant devices to a distributed control system, the system comprising:
 (a) communicably coupling a first field bus module (FBM) to the distributed control system;
 (b) coupling the first FBM to a first switch;
 (c) communicably coupling a second FBM to the distributed control system;
 (d) coupling the second FBM to a second switch;
 (e) communicably coupling the first and second FBMs to one another by the switches;
 (f) coupling a pair of field devices (FDs) to the switches, the FDs being redundant of one another, wherein data is synchronized therebetween, one FD of the pair having an address;
 (g) configuring the first and second FBMs to be redundant of one another, wherein data is synchronized therebetween through the first and second switches;
 (h) configuring the first and second FBMs to adopt respective roles as master FBM and tracker FBM, wherein the master FBM is configured to capture data from the one FD using the address, and to pass any data changes periodically to the tracker FBM, through the switches;
 (i) configuring the other FD of the pair to assume the address in the event of a failure of the one FD;
 (j) configuring the master FBM to point to the other field device in the event the other field device has assumed the address; and
 (k) configuring the first and second FBMs to switch roles in the event communication is disrupted between the master FBM and the FD having the address;
 wherein the system is redundant so that data is preserved in the event of failure of any one of the FBMs, FDs or switches.

13. The method of claim 12, wherein the redundant FDs comprise programmable logic controllers (PLCs).

14. The system of claim 13, comprising configuring the FBMs to receive a notification that the other FD has assumed the address, so that either of the FBMs can point to, and capture data therefrom.

15. The method of claim 14, comprising synchronizing the tracker FBM with the master FBM independently of any communication with the FDs.

16. The method of claim 15, comprising synchronizing the tracker FBM and master FBM independently of any off-network (out of band) communication therebetween.

17. The method of claim 16, comprising synchronizing the tracker FBM and master FBM using only a single data stream from the FDs to the FBMs.

18. The method of claim 17, comprising synchronizing the tracker FBM by sending only changes in data from the master FBM.

19. The method of claim 12, comprising configuring, in real time, the master FBM to point to the other field device, in the event the other field device has assumed the address.

20. The method of claim 12, comprising configuring the master FBM to use a single port for communication with the FD, and for communication with the tracker FBM.

21. The method of claim 12, comprising coupling a field control processor (FCP) to the first and second FBMs.

22. The method of claim 12, comprising disposing a local communications link between the first and second FDs for FD synchronization.

23. An article of manufacture for interfacing redundant devices to a distributed control system, said article of manufacture comprising:
 a computer usable medium having a computer readable program code embodied therein, said computer usable medium having:
 computer readable program code for:
 (a) communicably coupling a first field bus module (FBM) to the distributed control system;
 (b) coupling the first FBM to a first switch;
 (c) communicably coupling a second FBM to the distributed control system;
 (d) coupling the second FBM to a second switch;
 (e) communicably coupling the first and second FBMs to one another by the switches;
 (f) coupling a pair of field devices (FDs) to the switches, the FDs being redundant of one another, wherein data is synchronized therebetween, one FD of the pair having an address;
 (g) configuring the first and second FBMs to be redundant of one another, wherein data is synchronized therebetween through the first and second switches;
 (h) configuring the first and second FBMs to adopt respective roles as master FBM and tracker FBM, wherein the master FBM is configured to capture data from the one FD using the address, and to pass any data changes periodically to the tracker FBM, through the switches;
 (i) configuring the other FD of the pair to assume the address in the event of a failure of the one FD;
 (j) configuring the master FBM to point to the other field device in the event the other field device has assumed the address; and
 (k) configuring the first and second FBMs to switch roles in the event communication is disrupted between the master FBM and the FD having the address;
 wherein the system is redundant so that data is preserved in the event of failure of any one of the FBMs, FDs or switches.

24. The system of claim 1, wherein at least one of the first and second switches comprises an Ethernet switch.

25. The system of claim 1, wherein the address comprises a floating IP address.

26. The method of claim 12, using at least one of the first and second switches in the form of an Ethernet switch.

27. The method of claim 12, using an address in the form of a floating IP address.

* * * * *